US010372232B2

(12) United States Patent
Lee

(10) Patent No.: US 10,372,232 B2
(45) Date of Patent: Aug. 6, 2019

(54) KEYBOARD DEVICES WITH FLEXIBLE LAYERS AND LATTICE SUBSTRATES

(71) Applicant: HEWLETT-PACKARD DEVELOPMENT COMPANY, L.P., Houston, TX (US)

(72) Inventor: Chien-Kuo Lee, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/112,500

(22) PCT Filed: Mar. 12, 2014

(86) PCT No.: PCT/US2014/024153
§ 371 (c)(1),
(2) Date: Jul. 19, 2016

(87) PCT Pub. No.: WO2015/137938
PCT Pub. Date: Sep. 17, 2015

(65) Prior Publication Data
US 2016/0370874 A1 Dec. 22, 2016

(51) Int. Cl.
G06F 3/02 (2006.01)
G06F 3/044 (2006.01)

(52) U.S. Cl.
CPC .......... *G06F 3/0221* (2013.01); *G06F 3/0202* (2013.01); *G06F 3/044* (2013.01); *G06F 2203/04111* (2013.01)

(58) Field of Classification Search
CPC ...... G06F 3/0202; G06F 3/0221; G06F 3/044; G06F 2203/04111; G06F 3/047

USPC .................. 345/168–179; 178/18.01–18.04; 400/472–490
See application file for complete search history.

(56) References Cited

U.S. PATENT DOCUMENTS

| 4,795,998 | A | * | 1/1989 | Dunbar | G01L 1/205 338/208 |
| 4,916,262 | A | * | 4/1990 | Jungels-Butler | H01H 13/702 200/306 |
| 5,717,429 | A | * | 2/1998 | Coulon | H01H 13/705 200/344 |
| 6,498,600 | B1 | * | 12/2002 | Vance | G06F 3/0202 200/5 R |
| 7,710,405 | B2 | | 5/2010 | Keski-Jaskari et al. | |
| 8,127,437 | B2 | | 3/2012 | Lipton et al. | |
| 2002/0180578 | A1 | * | 12/2002 | Sandbach | G06F 3/045 338/99 |

(Continued)

FOREIGN PATENT DOCUMENTS

| CN | 202372925 | 8/2012 |
| CN | 203038828 U | 7/2013 |

(Continued)

*Primary Examiner* — Alexander Eisen
*Assistant Examiner* — Nelson Lam
(74) *Attorney, Agent, or Firm* — HPI Patent Department

(57) ABSTRACT

A keyboard device includes a flexible layer, electrical traces on the flexible layer and a lattice substrate to support the flexible layer. The keyboard device further includes a key actuatable to contact the flexible layer and to stretch at least a portion of the flexible layer into an opening in the lattice substrate and a sensor to detect a change of capacitance of the electrical traces in response to actuation of the key by a conductive object.

12 Claims, 4 Drawing Sheets

(56) References Cited

U.S. PATENT DOCUMENTS

| | | | |
|---|---|---|---|
| 2003/0044216 A1* | 3/2003 | Fang | H01H 13/702 400/491 |
| 2005/0238405 A1 | 10/2005 | Chapman et al. | |
| 2006/0181514 A1* | 8/2006 | Newman | G06F 1/163 345/168 |
| 2006/0251854 A1* | 11/2006 | Marmaropoulos | A41D 31/02 428/100 |
| 2007/0109274 A1* | 5/2007 | Reynolds | G06F 3/041 345/173 |
| 2007/0141939 A1* | 6/2007 | Sandbach | H01H 3/141 442/304 |
| 2007/0144873 A1* | 6/2007 | Chen | H01H 13/702 200/5 A |
| 2008/0180399 A1 | 7/2008 | Cheng | |
| 2010/0259498 A1* | 10/2010 | Harison | G06F 3/0224 345/173 |
| 2011/0032127 A1* | 2/2011 | Roush | H01H 13/785 341/34 |
| 2011/0100788 A1* | 5/2011 | Eck | H01H 13/803 200/61.93 |
| 2011/0284348 A1* | 11/2011 | Nohechi | H01H 13/83 200/50.36 |
| 2011/0305493 A1 | 12/2011 | Wu et al. | |
| 2012/0092263 A1* | 4/2012 | Peterson | G06F 3/016 345/168 |
| 2012/0103776 A1 | 5/2012 | Walker et al. | |
| 2013/0215035 A1* | 8/2013 | Guard | G06F 3/0221 345/168 |
| 2013/0264182 A1 | 10/2013 | Shen et al. | |
| 2014/0022177 A1* | 1/2014 | Shaw | G06F 1/1669 345/168 |
| 2014/0027259 A1* | 1/2014 | Kawana | H01H 13/705 200/517 |
| 2014/0090966 A1* | 4/2014 | Yu | H01H 13/705 200/5 A |
| 2014/0203953 A1* | 7/2014 | Moser | G06F 3/0202 341/27 |
| 2014/0354577 A1* | 12/2014 | Hanssen | G06F 3/044 345/174 |
| 2014/0374230 A1* | 12/2014 | Shaw | G06F 1/1632 200/5 A |
| 2015/0103011 A1* | 4/2015 | Large | G03H 1/0005 345/168 |
| 2016/0328043 A1* | 11/2016 | Moller | G06F 3/044 |

FOREIGN PATENT DOCUMENTS

| | | |
|---|---|---|
| EP | 2410408 | 1/2012 |
| KR | 10-0911120 | 8/2009 |
| TW | 201021066 | 6/2010 |

\* cited by examiner

KEYBOARD DEVICES WITH FLEXIBLE LAYERS AND LATTICE SUBSTRATES

BACKGROUND

Laptops or notebooks are often used as primary PC platforms by students and business people. They include most of the components of a desktop computer, including keyboard devices, while still being both compact and portable.

BRIEF DESCRIPTION OF THE DRAWINGS

By way of non-limiting examples, keyboard devices and methods of manufacturing such devices according to the present disclosure will be described with reference to the following drawings in which.

DETAILED DESCRIPTION

The present disclosure describes a keyboard device. The keyboard device of this example comprises a flexible layer, electrical traces on the flexible layer, and a lattice substrate to support the flexible layer. A key is provided and is actuatable to contact the flexible layer and to stretch at least a portion of the flexible layer into an opening in the lattice substrate. Furthermore, a sensor is provided to detect a change of capacitance of the electrical traces in response to actuation of the key by a conductive object.

In one example, the electrical traces are disposed on the flexible layer to form a grid defining a plurality of nodes. An example of a method of disposing the electrical traces on the flexible layer is by printing.

A node of the plurality of nodes may be substantially aligned with a corresponding opening of the lattice substrate and/or a corresponding key. For example, the portion of the flexible layer stretched into the opening in the lattice substrate may comprise a node of the plurality of nodes.

The present disclosure provides thinner and more streamlined keyboard devices without compromising the traditional touch and feel associated with typing on a standard keyboard.

Furthermore, the keyboard device of the present disclosure is a simpler structure involving fewer components than known keyboard devices and as such, is easier and more cost effective to produce.

Figure 1A:
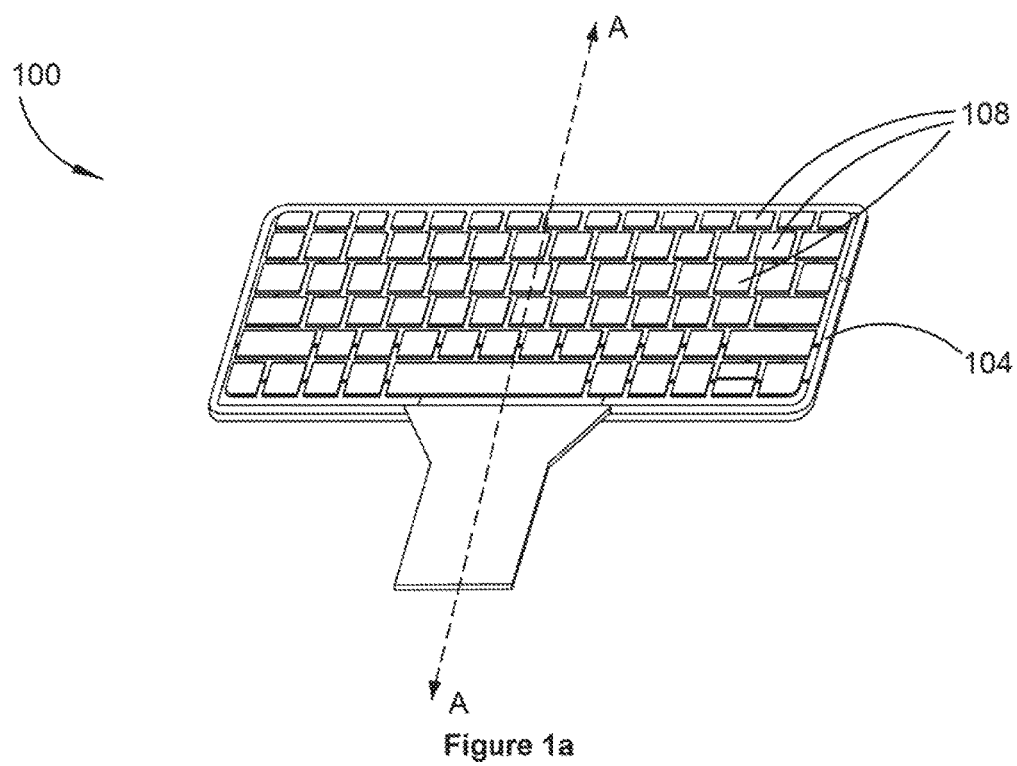
FIG. 1a is a perspective view of a keyboard device according to one example.
Figure 1B:
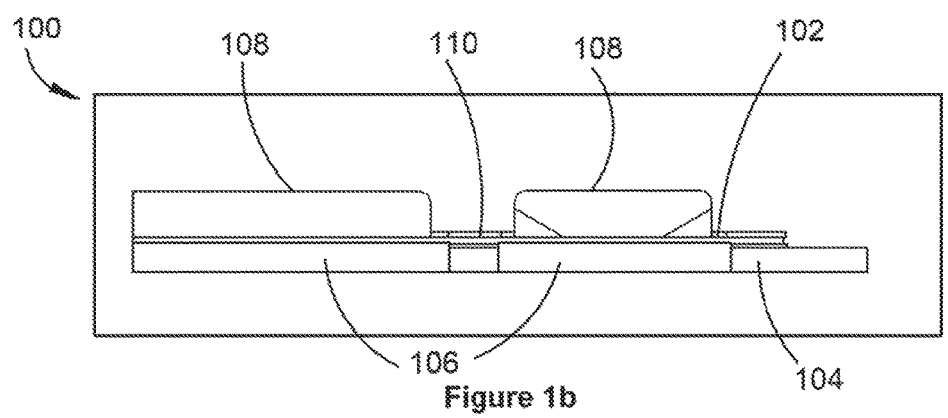
FIG. 1b is a side view of the keyboard device of FIG. 1a, taken along axis A-A.

Referring to FIGS. 1a and 1b, there is illustrated a keyboard device 100 according to the present disclosure. A keyboard device may be considered to be any input device having mechanical keys that can be used to provide input to a computer system by movement of the physical key.

The keyboard device 100 comprises a flexible layer 102 disposed on a lattice substrate 104 having a plurality of openings 106. In one embodiment, the flexible layer 102 is a flexible film and may be composed from any suitable material. For example, the flexible film may be composed from a plastics material such as polyethylene terephthalate (PET), polyimide, polyether ether ketone (PEEK) or polyester.

As depicted, a plurality of elements or keys 108, such as key caps, are coupled to and/or disposed on the flexible layer 102 and cooperate with the lattice substrate 104 such that the keys 108 are aligned or in register with a corresponding opening 106 in the lattice substrate 104.

In some embodiments, a frame 110 is disposed on the flexible layer 102 and accommodates the plurality of keys 108. For example, the frame 110 may provide support or protection or act as a movement guide for the keys 108.

In some embodiments, the lattice substrate 104, and/or the frame 110 are composed of plastics materials such as PC MYLAR or stamp metal. However, it will be appreciated that any suitable materials may be employed.

Figure 2:
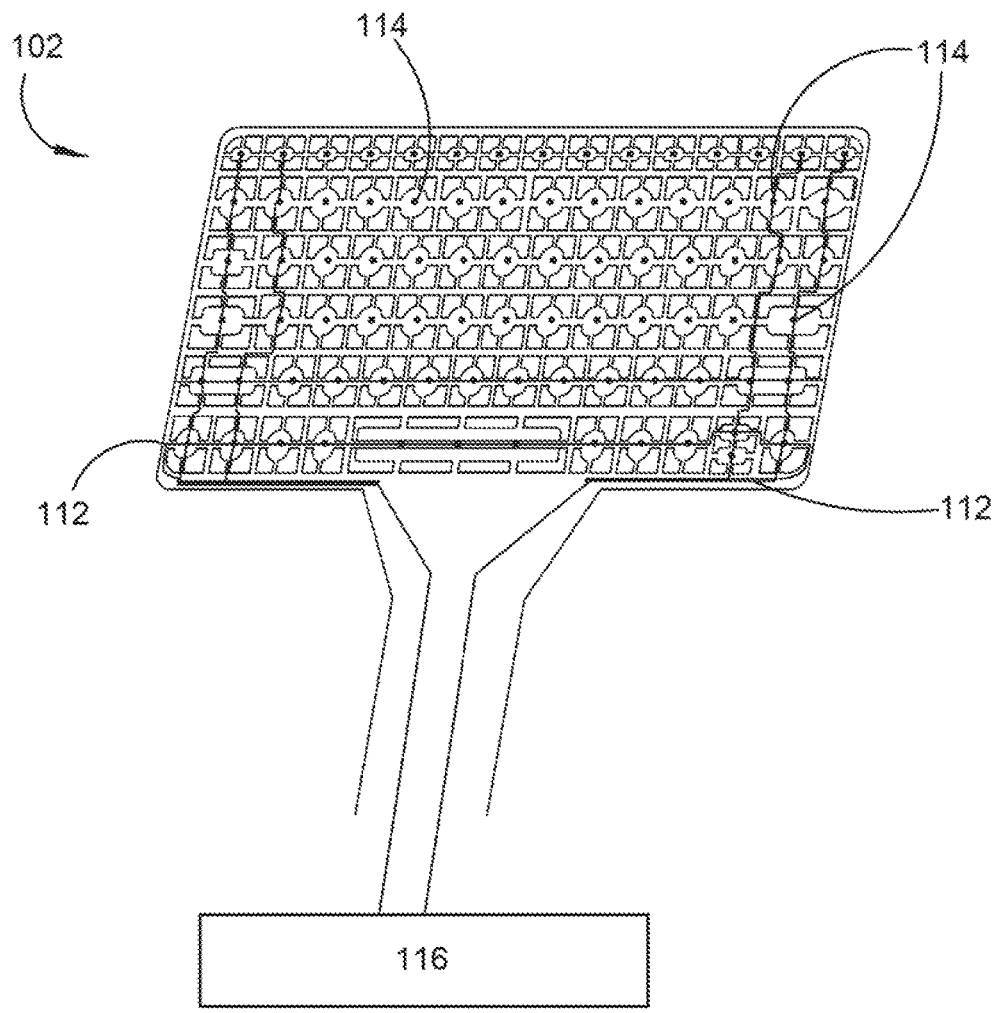
FIG. 2 is a perspective view of a flexible layer of the keyboard device of FIGS. 1a and 1b.

As illustrated in FIG. 2, the flexible layer 102 comprises a plurality of electrical traces 112 or electrodes disposed thereon. The electrical traces 112 may be composed of any suitable material, such as copper, indium tin oxide (ITO), printed ink, print metal syrup, such as silver or aluminium, or electric conductor glue. An example method at disposing the electrical traces 112 on the flexible layer 102 is discussed in more detail below with reference to FIG. 4.

The electrical traces 112 may be disposed on the flexible layer 102 to form a grid of overlapping or intersecting X and Y electrical traces, the overlapping or intersecting X and Y electrical traces defining a plurality of nodes 114. For example, the X and Y electrical traces 112 may be separated from one another by a dielectric, and as such, each node 114 may behave as a capacitor.

In one embodiment, an AC voltage is applied to at least one of the X and Y electrical traces 112 to generate a uniform electrostatic field sensitive to proximity of a conductive object, such as a conductive element or a user's finger.

A sensor 116 is provided to detect a presence of a conductive object at or in a vicinity of a node 114.

When a conductive object is placed in proximity to the X or Y electrical traces 112 at a node 114, a local electrostatic field at that node 114 may be distorted, causing a change in mutual capacitance between the X and Y electrical traces 112. If a conductive object bridges a gap between the X and Y electrical traces 112 at the node 114, the charge field may be further interrupted, causing a relatively greater change in capacitance between the X and Y electrical traces 112.

Similarly, when a conductive object is placed in proximity to the X or Y electrical traces 112 at a node 114, a local electrostatic field at that node 114 may be distorted, causing a change in self-capacitance of the X electrical trace 112 and a change in self-capacitance of the Y electrical trace 112.

In one embodiment, the sensor 116 senses the mutual capacitance between the X and Y electrical traces 112 at each node 114 of the flexible layer to detect a presence of a conductive object at a node 114.

In another embodiment, the sensor 116 senses the capacitance of each individual X and Y electrical trace 112 to identify the X and Y electrical traces 112 having a greater self-capacitance than other X and Y electrical traces 112 to thereby detect a presence of a conductive object at a node 114 of the flexible layer 102.

Figure 3A:
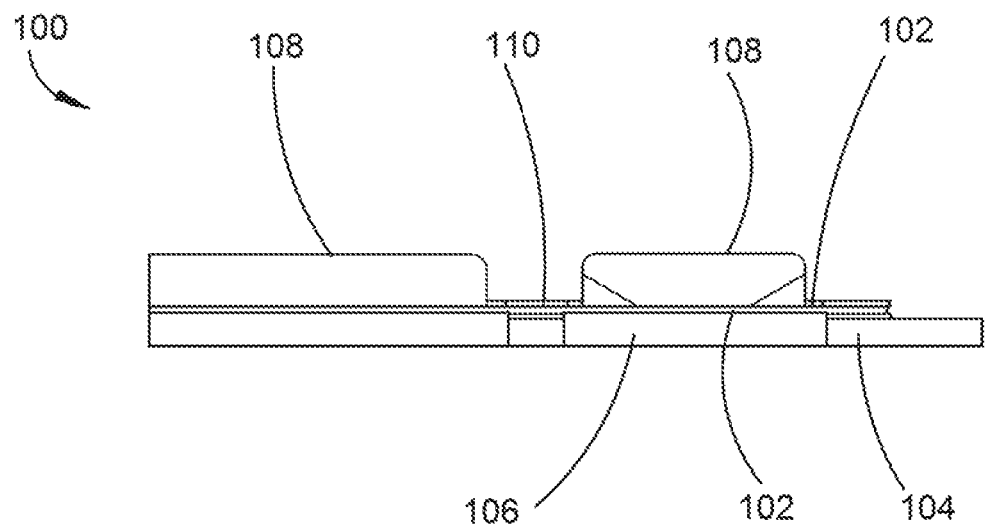
FIG. 3a is a side view of the keyboard device of FIG. 1a, in an unactuated state.
Figure 3B:
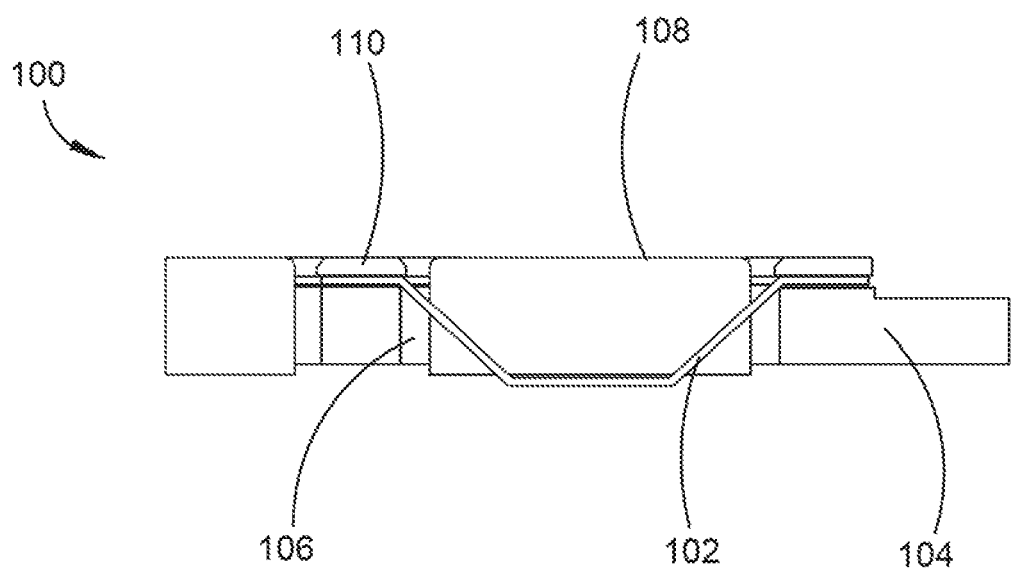
FIG. 3b is a side view of the keyboard device of FIG. 1a, in an actuated state.

In one embodiment, the keys 108 transition from an unactuated state, as illustrated in FIG. 3a, to an actuated state, as illustrated in FIG. 3b, in response to actuation of the key 108, such as the pressing of the key 108 by a user.

As the key 108 transitions from the unactuated state toward the actuated state, the key 108 engages with the flexible layer 102, causing at least a portion of the flexible layer 102 to deform. In one embodiment, the flexible layer deforms or stretches in response to movement of the key 108 with respect to the lattice substrate. For example, movement of the key from the unactuated state to the actuated state may cause the flexible layer 102 to deform, for example, to stretch and extend into the opening 106 of the lattice substrate 104 aligned with the key 108.

In one embodiment, the nodes 114 are substantially aligned or in register with a corresponding opening 106 of the lattice substrate 104 and a corresponding key 108 seen that when a key 108 is actuated, for example, pressed, the key 108 contacts and deforms or stretches the underlying flexible layer 102, causing a portion of the flexible layer 102, which includes a node 114, to extend into the opening 106 of the lattice substrate 104.

In another embodiment, the keys 108 are out of register with the openings 106, such that when a key 108 is actuated, for example, pressed, the key 108 contacts and deforms or stretches the underlying flexible layer 102 causing a portion of the flexible layer 102 which does not include a node 114, to extend into the opening 106 of the lattice substrate 104.

In one example, each node 114 is associated with an X-Y co-ordinate corresponding to a position or location in the grid of the flexible layer 102 and at least some of the nodes 114 are associated with corresponding keys 108. Accordingly, a change in capacitance detected at a particular node 112 corresponds with the actuation of a particular key 108 of the keyboard device 100.

The flexible layer 102 accommodates movement of the keys 108 as they transition between the unactuated and actuated states, thereby preserving the traditional touch and feel associated with typing on a keyboard. Furthermore, the movement of the keys 108 in response to actuation by a user may serve to provide tactile feedback to the user that the intended key cap 108 was depressed, and thereby increase precision and speed oil the user's typing.

Figure 4:
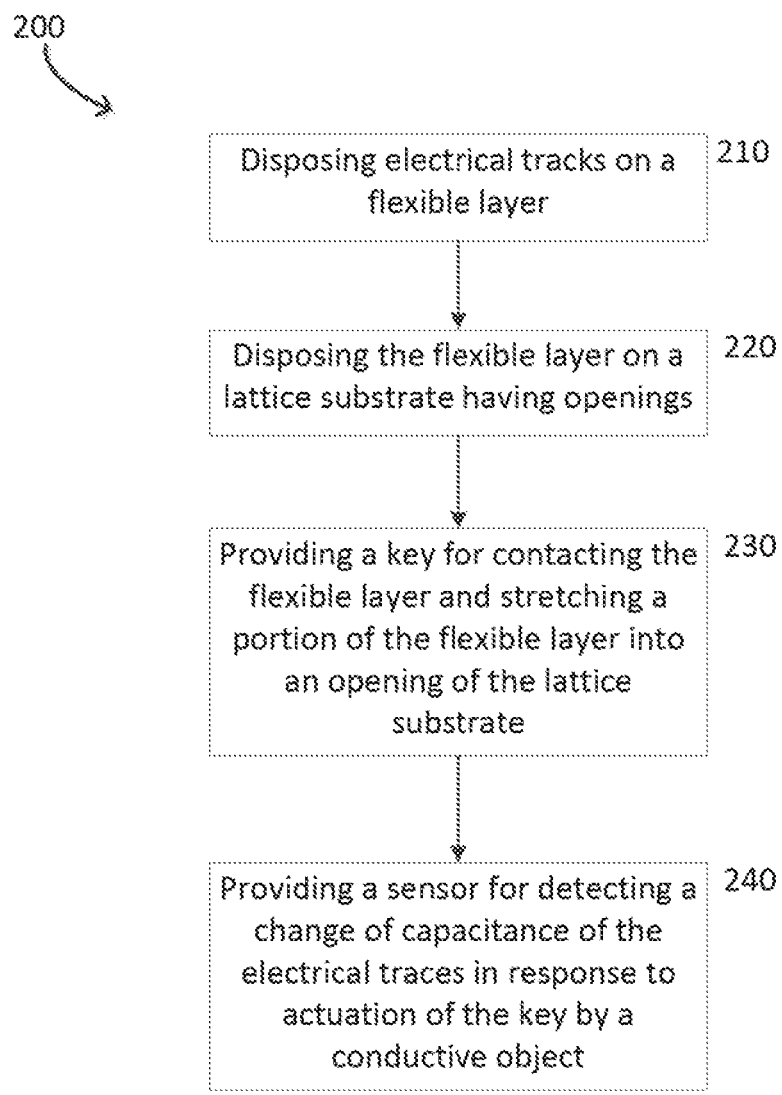
FIG. 4 is a flow diagram depicting an example method of manufacturing the keyboard device of FIGS. 1a and 1b.

Referring to FIG. 4, which is a flow chart depicting an example method 200 of manufacturing the keyboard device 100.

The method involves providing 210 electrical traces 112 on the flexible layer 102. For example, the electrical traces 112 may be disposed on the flexible layer to form a grid defining a plurality of nodes 114.

In one embodiment, the electrical traces 112 may be printed on the flexible layer 102. For example, prior to printing, the flexible layer 102 may be stretched or extended and held in an extended state while the electrical traces 112 are printed on flexible layer 102. The flexible layer 102 may then be released from the extended state before continuing the manufacturing process.

By providing or printing the electrical traces on the flexible layer when it is held in an extended state before allowing it to return to the unextended state, the electrical traces of the flexible layer are less prone to cracking and related failure issues during use of the keyboard device.

The flexible layer 102 is disposed 220 on a lattice substrate 104 having a plurality of openings 106. In one embodiment, the flexible layer 102 is disposed on the lattice substrate 104 such that, at least some of the plurality of nodes 114 of the flexible layer 102 are aligned with the openings 106 of the lattice substrate 104. In another embodiment, the flexible layer 102 is disposed on the lattice substrate 104 such that, at least some of the plurality of nodes 114 of the flexible layer 102 are misaligned or out of register with the openings 106 of the lattice substrate 104.

An element 108, such as a key or a key cap, is provided 230 for contacting the flexible layer 102. In one embodiment, the key 108 is affixed, for example, using adhesive or glue, to the flexible layer 102. The key 108 may be affixed to the flexible layer 102 such that it is aligned with an opening 106 of the lattice substrate 104.

A sensor 116 is provided 240 for detecting or sensing a change; in capacitance, for example, self-capacitance or mutual capacitance, of the X and Y traces 112 of the flexible layer as result of a conducting object being brought into proximity with a node 114 of the flexible layer 102, as discussed above.

In one embodiment, actuation of the key 108 by a conductive object, such as a conductive element or a user's finger, causes a distortion of the electrostatic field at a node 114 of the flexible layer 102 associated with the key 108 and causes a portion of the flexible layer aligned with the key 108 to extend into the corresponding opening 106 of the lattice substrate 104, as described above.

In some embodiments, a frame 110 is disposed on the flexible layer 102 to accommodate or support the keys 108.

By manufacturing the keyboard device 100 according to the example of the present disclosure, the overall height of the keyboard device is minimal and substantially thinner than traditional keyboard devices, such as a scissors structure keyboard, which has an overall height of approximately 3.8 mm.

In one embodiment, the flexible layer 102 height is approximately 0.2 mm, the key height is approximately 1.7 mm, and the opening 106 of the lattice substrate is approximately 1.5 mm, resulting in an overall maximum keyboard device height of approximately 3.4 mm.

Throughout this specification the word "have", or variations such as "has" or "having", will be understood to have the same meaning as the word "comprise" and to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A keyboard device comprising:
    a flexible layer;
    electrical traces printed on the flexible layer, wherein the electrical traces comprise a first electrical trace and a second electrical trace, the first electrical trace overlaps the second electrical trace to form corresponding nodes at intersection points of the first and second electrical traces, and the nodes comprise a first node;
    a lattice substrate to support the flexible layer, wherein the flexible layer is disposed outside of an opening in the lattice substrate such that the first node is disposed outside of the opening;
    a key actuatable to contact the flexible layer and to stretch at least a portion of the flexible layer into the opening in the lattice substrate from outside of the opening to cause the first node to stretch into the opening by the key becoming disposed within the opening if actuated; and a sensor connected to the first trace and the second trace to detect a change of capacitance of the first and second electrical traces in response to actuation of the key by a conductive object.

2. The keyboard device of claim 1 wherein the key is disposed on the flexible layer in alignment with the opening in the lattice substrate.

3. The keyboard device of claim 1, wherein a node of the plurality of nodes is substantially aligned with a corresponding opening of the lattice substrate.

4. The keyboard device of claim 1, wherein a node of the plurality of nodes is substantially aligned with a corresponding key.

5. The keyboard device of claim 1, wherein the portion of the flexible layer stretched into the opening in the lattice substrate comprises a node of the plurality of nodes.

6. The keyboard device of claim 1, wherein the key is a key cap.

7. A keyboard device comprising:
- a flexible film;
- electrical traces printed on the flexible film, wherein the electrical traces comprise a first electrical trace and a second electrical trace, the first electrical trace overlaps the second electrical trace to form corresponding nodes at intersection points of the first and second electrical traces, and the nodes comprise a first node;
- a lattice structure to support the flexible film, wherein the lattice structure having an opening and the flexible film being disposed outside of the opening such that the first node is disposed outside of the opening;
- a depressible element to contact and stretch the flexible film into the opening to cause the first node to stretch into the opening from outside of the opening by the depressible element becoming disposed within the opening if depressed; and
- a sensor connected to the first trace and the second trace to detect a change of capacitance of the first and second electrical traces in response to depression of the element by a conductive object to contact the flexible film.

8. The keyboard device of claim 7, wherein the depressible element is moveable with respect to the lattice structure to stretch the flexible film.

9. A method of manufacturing a keyboard device comprising:
- printing electrical traces on a flexible layer, wherein the electrical traces comprise a first electrical trace and a second electrical trace, the first electrical trace overlaps the second electrical trace to form corresponding nodes at intersection points of the first and second electrical traces, and the nodes comprise a first node;
- disposing the flexible layer on a lattice substrate, wherein the flexible layer is disposed outside of an opening in the lattice substrate such that the first node is disposed outside of the opening;
- providing a key movable into the opening of the lattice substrate for contacting the flexible layer and stretching a portion of the flexible layer into the opening of the lattice substrate from outside of the opening to cause the first node to stretch into the opening by the key becoming disposed within the opening if actuated; and
- providing a sensor connected to the first trace and the second trace for detecting a change of capacitance of the first and second electrical traces in response to actuation of the key by a conductive object to contact the flexible layer.

10. The method of claim 9, wherein providing the key for contacting the flexible layer comprises disposing the key on the flexible layer in alignment with the opening of the lattice substrate.

11. The method of claim 9, wherein printing the electrical traces on the flexible layer comprises printing the electrical traces on the flexible layer to form a grid defining a plurality of nodes.

12. The method of claim 9, further comprising extending the flexible layer to an extended state, printing the electrical traces on the flexible layer in the extended state and releasing the flexible layer from the extended state.

* * * * *